United States Patent [19]
Peacock

[11] Patent Number: 5,970,920
[45] Date of Patent: Oct. 26, 1999

[54] BRISKET BARRIER FOR MILKING PARLORS

[75] Inventor: Steve Peacock, Portales, N.Mex.

[73] Assignee: P.B.I. Parlor Systems, Portales, N.Mex.

[21] Appl. No.: 09/112,237

[22] Filed: Jul. 9, 1998

[51] Int. Cl.⁶ ................................................. A01K 15/04
[52] U.S. Cl. ...................... 119/738; 119/738; 119/14.08; 119/510; 119/520
[58] Field of Search ..................... 119/510, 520, 119/522, 523, 738, 14.08, 14.03, 729, 743, 744, 745, 746, 747

[56] References Cited

U.S. PATENT DOCUMENTS

| | | | |
|---|---|---|---|
| 4,763,605 | 8/1988 | Braum | 119/14.03 |
| 4,951,608 | 8/1990 | Reisgies et al. | 119/14.03 |
| 5,259,335 | 11/1993 | Moreau | 119/14.03 |
| 5,285,746 | 2/1994 | Moreau | 119/14.08 |
| 5,423,289 | 6/1995 | Larsen et al. | 119/520 |
| 5,584,261 | 12/1996 | Hart et al. | 119/14.03 |
| 5,638,768 | 6/1997 | Moreau | 119/14.03 |
| 5,666,903 | 9/1997 | Bull et al. | 119/14.01 |
| 5,727,504 | 3/1998 | Koster | 119/520 |

*Primary Examiner*—Michael Cerone
*Assistant Examiner*—Judith A. Nelson
*Attorney, Agent, or Firm*—Shoemaker and Mattare, Ltd.

[57] ABSTRACT

A brisket barrier for milking parlors includes a transverse bar mounted for sliding movement on vertical supports. The bar has a release position at floor level, a retaining position at brisket level, and an index position where it presses rearward against the brisket. The arrangement provides for uniform positioning of cows in standard stalls, regardless of the cows' size. The cows simply step over the lowered bar to exit the stall.

7 Claims, 3 Drawing Sheets

BRISKET BARRIER FOR MILKING PARLORS

BACKGROUND OF THE INVENTION

This invention relates to a brisket barrier for milking parlors.

In modern dairies, cows are milked in standard stalls using automated equipment. The milking process depends on accurately locating the cows in the stalls, so that the equipment will be properly positioned with respect to the udder in each case.

The stall is not much larger than the cow. The rear of the stall is defined by a butt plate that the cow can back up to. The front is defined by some sort of movable barrier: the type of barrier contemplated by this invention is a brisket barrier, that is, a transverse bar which engages the animal just in front of its shoulders.

One prior patent disclosing a brisket barrier for use in a milking parlor is U.S. Pat. No. 5,638,768. It shows an arrangement in which the brisket barrier pivots down from above the cow, against the brisket, forcing the cow back toward the butt plate or splash shield.

SUMMARY OF THE INVENTION

An object of this invention is to provide a brisket barrier for milling parlors which rises from a release position at floor level to a restraining position in front of the brisket, and then moves toward the brisket, forcing the cow rearward against the butt plate.

A related object is to provide a brisket barrier which is lowered, rather than raised, to release cows from the stall.

These and other objects are attained by a brisket barrier for milking parlors, which include a pair of vertical support members, each having a vertically extending rail, and a horizontal bar extending between and supported on each of the vertical support members. A pair of arms are attached to the horizontal bar, each arm being adjacent a respective one of the vertical support members and having a follower for engaging a respective one of the rails. The bar is raised by hydraulic or pneumatic cylinders, and when the followers reach the upper end of their rails, the bar swings outward, contacting the brisket of the cow, encouraging the cow to move rearward against the rear of the stall.

BRIEF DESCRIPTION OF THE DRAWINGS

In the accompanying drawings.

DESCRIPTION OF THE PREFERRED EMBODIMENT

Figure 1:
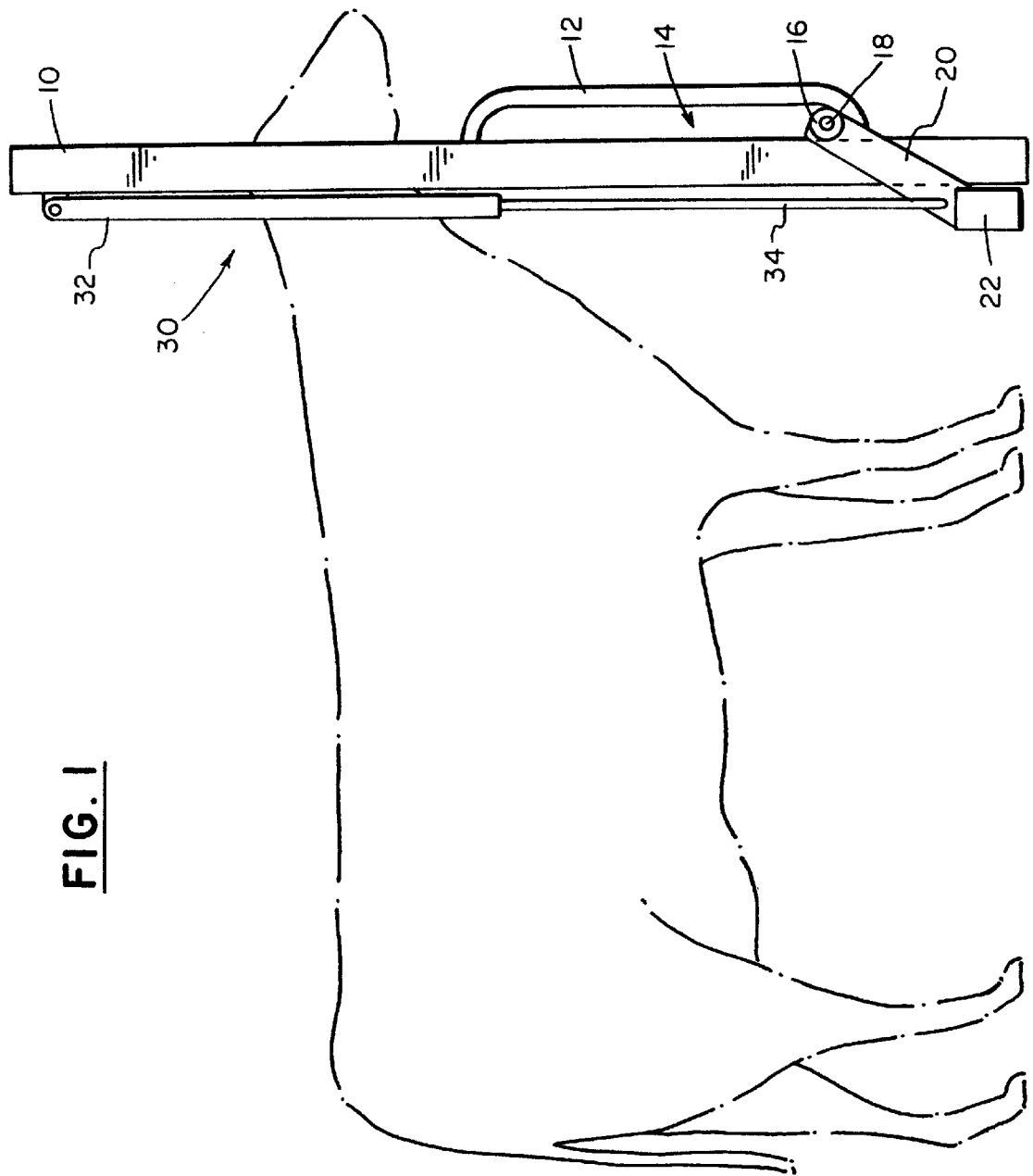
FIG. 1 is a side elevation of a brisket barrier for milking parlors, embodying the invention.
Figure 2:
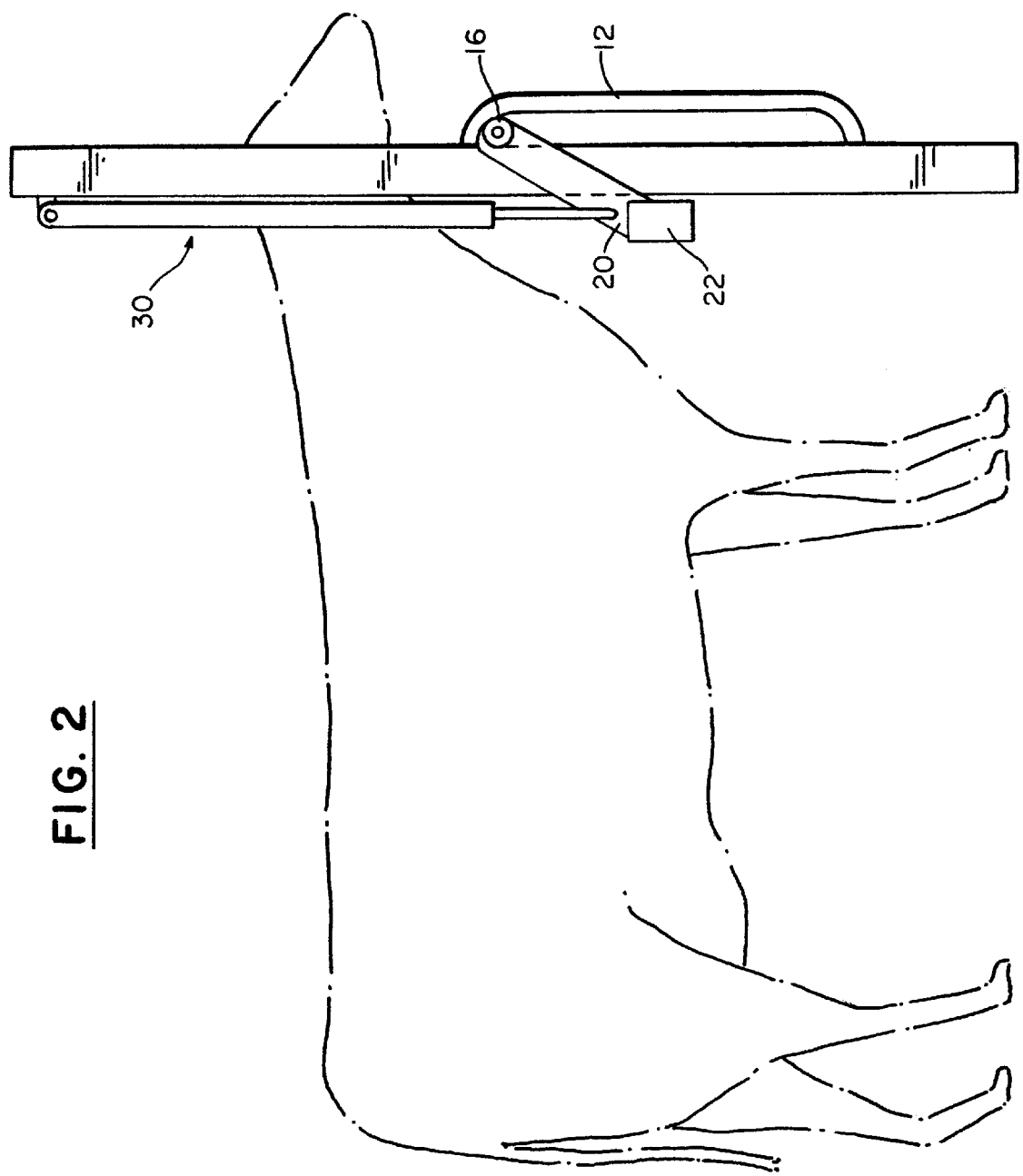
FIG. 2 is a view like FIG. 1, showing the barrier raised to retain a cow in the stall.
Figure 3:
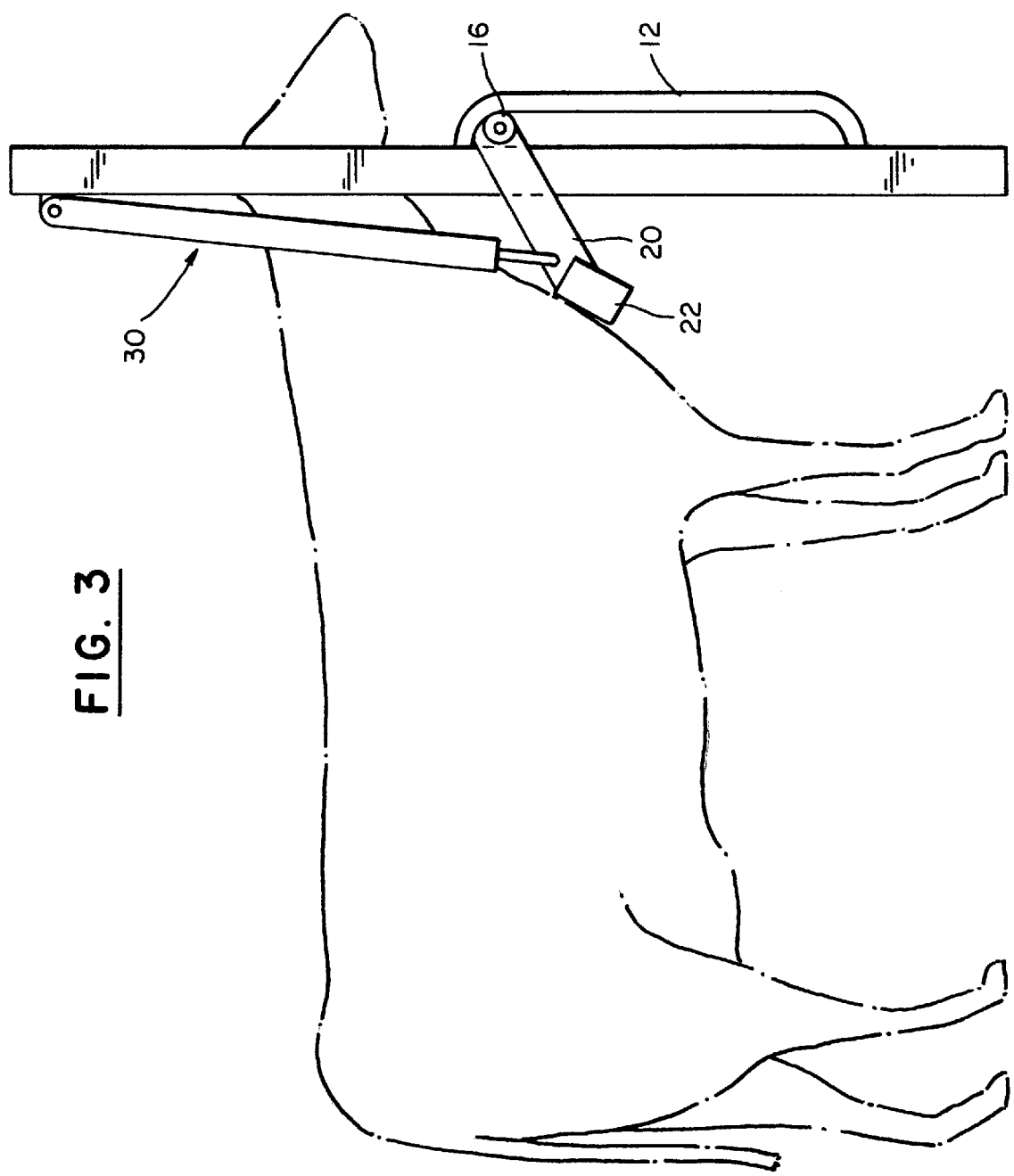
FIG. 3 is a view like FIG. 1, showing the barrier indexed rearward to force the cow to the rear of the stall so that it can be milked.

A brisket barrier for milking parlors embodying the invention is shown in FIGS. 1–3.

It comprises a pair of vertical support members 10 (one of which appears in the drawings), each having attached to one side a vertical rod 12 Which defines a gap 14 of constant width. A captured roller 16 or wheel moves vertically within the gap. Each roller has a grooved periphery, which keeps the wheel captive in the gap, and turns on an axle 18 connected to a respective one of a pair of arms 20, each of which is welded to one end of a rectangular, horizontal bar 22 that extends transversely across the front of the stall.

To raise and lower the bar, there is at least one pneumatic or hydraulic cylinder 30 with a long stroke, having its upper end (housing) 32 fixed to the upper end of the support, and its lower end (piston rod) 34 pinned to the free end of the arm. The cylinder is operated by a hydraulic system (not shown) including valves controlling flow of a pressurized fluid. To design such a system is a matter of ordinary skill.

When the cylinder is actuated to move the bar up and down as shown in FIGS. 1 and 2, the bar slides along one face of each support member. In FIG. 2, the roller has come into contact with the top of the gap, and can move no further. Now, further retraction of the cylinder (FIG. 3) causes the arms to swing about the axle of the immobilized rollers. As a consequence, the bar swings away from the support members, toward the brisket, and pushes the cow rearward as it contacts the cow. The cow moves rearward until its rear strikes the butt plate; now the udder position is accurately known, irrespective of the size of the cow.

The air or hydraulic pressure applied to lift the cylinder can be varied. One may find the optimum pressure by routine experimentation. Also, one might substitute other types of linear motors, or even non-linear motors for the cylinders presently preferred.

Other variations are possible. For example, it may be possible to replace the pair of vertical support members with one single support member, or to use a single cylinder in place of the two described. And to substitute a slider for the roller follower described above, or to alter the form of the rail that the follower moves along, would be matters of design choice.

Since the invention is subject to modifications and variations, it is intended that the foregoing description and the accompanying drawings shall be interpreted as only illustrative of the invention defined by the following claims.

I claim:

1. A brisket barrier for positioning a cow in a milking parlor stall said barrier comprising a pair of vertical support members, each having a vertically extending rail, a horizontal bar extending between and supported on each of the vertical support members, a pair of arms attached to the horizontal bar, each arm being adjacent a respective one of the vertical support members and having a follower for engaging a respective one of said rails, at least one motor for raising said bar, said rail having a stop at its upper end which is engaged by the follower when the bar is raised, thereby arresting the follower end of the arm, whereby father raising of the bar causes the bar to swing toward the cow, the stop being positioned so that the bar contacts the brisket of the cow.

2. The invention of claim 1, wherein the rail is on a side of the vertical support member remote from the cow, and the bar is on the side of the vertical support member nearer the cow.

3. The invention of claim 1, wherein the rail comprises a rod having an intermediate segment parallel to its respective vertical support member, thus defining a gap of constant width, and upper and lower end segments connected to the vertical support member, thus defining upper and lower stops.

4. The invention of claim 3, wherein the follower is a roller having a grooved periphery engaging the rod and help captive in said gap.

5. The invention of claim 1, wherein the motor is a linear motor.

6. The invention of claim 5, wherein the linear motor is a pneumatic or hydraulic cylinder.

7. The invention of claim 6, wherein the cylinder has a housing attached near the top of the vertical support member and a piston rod extending from the housing and connected to a corresponding one of said arms.

* * * * *